MODULAR TRANSLATOR

Filed April 12, 1966 2 Sheets-Sheet 1

MODULAR TRANSLATOR

United States Patent Office 3,404,314

Patented Oct. 1, 1968

3,404,314
MODULAR TRANSLATOR

Bloomfield James Warman, Charlton, London, England, assignor to Associated Electrical Industries Limited, London, England, a British company Filed Apr. 12, 1966, Ser. No. 542,171
Claims priority, application Great Britain, Apr. 22, 1965, 17,036/65
5 Claims. (Cl. 317—101)

ABSTRACT OF THE DISCLOSURE

A code point translator built up from modular cells and thereby providing great flexibility of growth. Each cell is completely self-contained and has two end faces through which project the terminals of diodes contained in the cells and on which faces are conductive strips providing for connection to the diodes and to another adjacent cell. When a plurality of cells are arranged together in a modular assembly of row and column formation the conductive strips connected end-to-end form multipling connections across the two assembly faces, those on one face extending orthogonally with respect to those on the other and constituting respectively digit marking connections and code point marking connections.

This invention relates to digital translators of the so-called code-point kind, namely in which information presented digitally as one of a plurality of different combinations of on-off digit signals (markings) is converted to or derived from a marking presented at one of a plurality of code points each specifically related to a particular digit combination or combinations. Thus, for example, the code points may respectively relate to different numerically identified connections equipment locations or information locations (addresses) in a telephone exchange or computer, and the translator may then function either to respond to a digitally presented numerical identification by marking the relevant code point, or itself to present such a digital identification in response to the marking of a particular code-point.

According to the invention, a code-point translator is provided in the form of a modular assembly comprising a plurality of modular cells (modules) arranged in row and column formation and each containing an assembly of diodes having terminal connections extending out through the end faces of the modular assembly for selective connection to multipling connections extending across each of the end faces of the modular assembly, the multipling connections across one end face constituting digit marking connections while those across the other end face constitute code-point marking connections.

Preferably the multipling connections across each end face of the assembly are constituted by transverse conductors which, being provided individually for each module, extend across its end face and terminate adjacent opposite edges thereof in a manner permitting multipling interconnection with corresponding conductors at the same end of an adjacent module in the same row or column as the case may be, for instance as described in our copending application No. 15,992/63 or 12,396/64. The possibility is not excluded, however, of each multipling connection being constituted by a single conductor running across the ends of all the modules in a row or column.

The invention and the mode of utilisation of a translator embodying it will be more fully understood from the accompanying drawings, in which.

Figure 1:
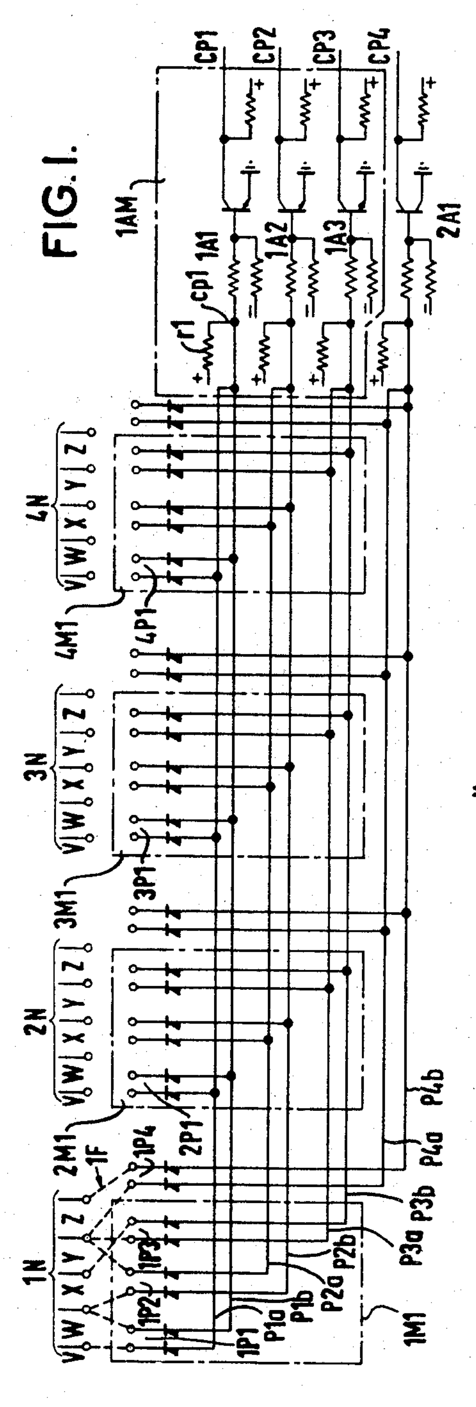
FIG. 1 illustrates the basic circuitry of a code-point translator.

Referring to FIG. 1 it is assumed that the translator is required to function in respect of numerical identifications constituted by four decimal digits each individually presented in two-out-of-five code. For this purpose there are four groups of marking leads, 1N, 2N, 3N, 4N, each comprising five marking leads V, W, X, Y, Z two of which will be marked according to the particular value which is to be indicated for the relevant digit at any time. The marking of a lead is effected by the substitution of one distinctive potential (e.g. a positive potential) for another (e.g. earth). The marking leads V, W, X, Y, Z, of each group (group 1N will be taken as typical) terminate at one side of a strapping field 1F at the other side of which is a pair of strapping terminals such as 1P1 for each different identification to be translated. Each such pair of strapping terminals is strapped, according to the value of the appertaining digit in the identification to which it relates, to those two of the marking leads V, W, X, Y, Z which are marked in the relevant group to represent that value. The strapping terminals of each pair, and likewise those of each corresponding pair in the other groups (namely all the pairs which relate to different digits of one and the same identification) are connected through respective diodes, as shown, to two marking multiples such as P1*a* and P1*b* for pair 1P1 and the corresponding P1 pairs 2P1, 3P1, 4P1 in the other groups. The marking multiples of each such pair thereof are connected to a common point such as *cp*1 for pair P1*a*, P1*b* to which is also connected a resistor such as *r*1 having its other end connected to a bias potential corresponding to the marking potential. This resistor *r*1 and the diodes connected to the associated pair of multiples P1*a*, P1*b* together constitute a resistance-rectifier "AND" gate by which the common point *cp*1 becomes marked when and only when the marking lead groups 1N–4N are marked to represent the particular identification to which the associated P1 marking terminal pairs relate. Each such common point therefore constitutes a code-point for a particular identification, being marked when and only when that identification is represented by markings in the groups 1N–4N.

The translator as described above translates a digital identification into a unique code-point marking. Clearly a similar arrangement could be used (in reverse) for translating a code-point marking into a digital identification.

In FIG. 1 each code point such as *cp*1 is shown connected to a code-point amplifier such as 1A1 having an output marking lead such as CP1. The marking of leads V, W, X, Y, Z in the several groups thereof may also be effected through respective drive amplifiers (not shown).

Figure 2:
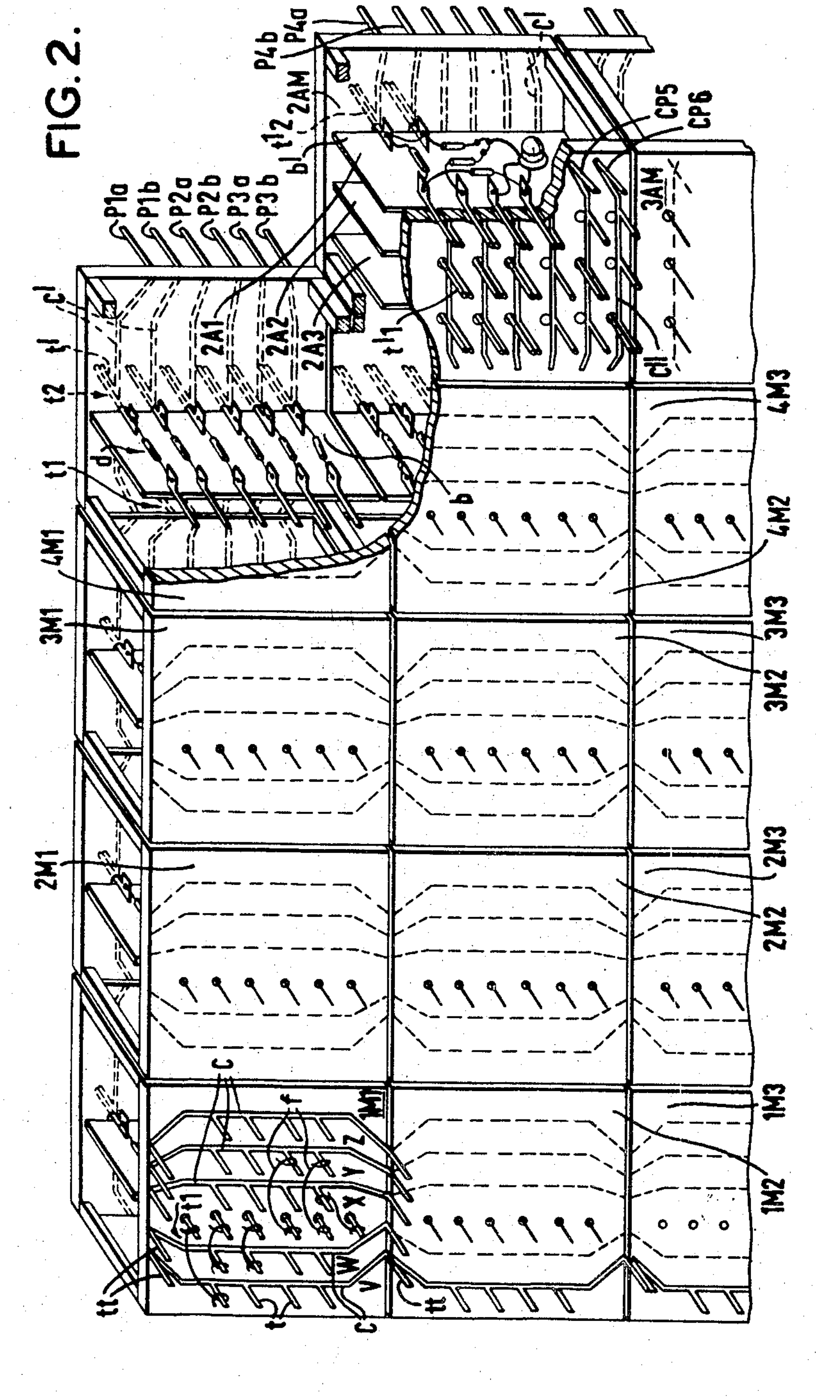
FIG. 2 illustrates somewhat schematically a modular build-up of this translator in a manner according to the invention.

In FIGS. 1 and 2 corresponding references have been employed where appropriate to indicate correspondence between various parts.

Referring to FIG. 2, the translator is built-up as a matrix of modules, –M–, each providing the (six) diodes required for a group of three marking terminal pairs (such as 1P1, 1P2, 1P3) associated with a particular identification digit.

The modules such as 1M1, 2M1, 3M1 and 4M1 in each row provide the diodes for mutually corresponding groups of marking terminal pairs respectively relating to the several identification digits.

The modules such as 1M1, 1M2, 1M3 — in each column provide the diodes for additional groups of marking terminal pairs to make up the total number required, as determined by the number of different identifications to be translated.

As shown for module 4M1 the diodes *d* in each module are mounted on a board or card *b* and connected between projecting terminal members *t*1 and *t*2 which protrude out through the opposite ends of the module. Across the front end of each module (as shown for module 1M1 and indicated only by dotted lines for the other modules) extend a number of conductors *c* equalling in number and corresponding to the marking leads V, W, X, Y, Z constituting a digit marking group such as 1N. Each of the conductors *c* has a number of projecting connecting portions such as *t* and terminal tag portions such as *tt* at opposite edges of the module. These tag portions lie alongside, and are interconnected with, the similar tag portions at the adjacent edge of the next module in the same column, so that the conductors *c* of the several modules in the column, interconnected at their tag portions, together constitute a plurality of multiples corresponding to the digit marking leads V, W, X, Y, Z constituting a digit group in FIG. 1. The terminals *t*1 of the diode card within each module are selectively strapped to the conductors *c* (using their connecting projections *t*) by way of example, strappings *f* are shown for module 1M1 corresponding to those shown in the strapping field 1F for terminal pairs 1P1, 1P2, 1P3. These strappings *f* are indicated as being constituted by short lengths of wire wrapped round the projecting terminal members *t*1 at one end and round the relevant connecting portions *t* at their other end. As an alternative these strapping wires, which may be distinctly coloured to designate the identity of the strap, may at their last mentioned end be wrapped round a separate terminal post or simply be bent at right angles and then back on itself to form a bight with a tail, which post or tail is then inserted through a hole for it in the end of the module so as to lie alongside the relevant connecting projection *t*, to which the post or bight is thereafter connected, e.g. by dip soldering.

At the rear end of each module, conductors *c'* similarly extend across the end of the module, in a direction at right angles to that of the conductors *c* at the front of the module, to form multiples with the corresponding conductors of the other modules in the same row. These multiples correspond to the code-point marking multiples (such as P1*a*, P1*b*) associated with the pertinent pairs of marking terminals (e.g. P1, P2, P3 for the M1 modules) to which the row of modules relates. The projecting terminals *t*2 from the diode card within each module extend alongside connecting projections *t'* on the conductors *c'* and are connected thereto, e.g. by soldering, so that each diode is connected to one of the multiples formed by the conductors *c'*.

The code-point amplifiers such as 1A1 in FIG. 1 may also be provided in groups of three in modules assembled with the diode modules at the ends of the respective rows. This is illustrated in FIG. 2 for an amplifier module 2AM assembled at the end of the row of modules 1M2–4M2. (The amplifiers 1A1, 1A2, 1A3 would likewise be provided in a module 1AM but this module is absent in FIG. 2 because of the breaking away of the assembly to reveal the module interiors.) In the module 2AM the components of three amplifiers 2A1, 2A2, 2A3 are seen mounted on respective boards or cards such as *b'* with terminals *t'*1 and *t'*2 projecting out through the front and rear ends of the module. Conductors *c'* extend across the rear of the module as before (thereby extending the marking multiples of the appertaining row to this module) and conductors *c''* extend across the front to afford supply connections and output marking connections to the three amplifiers. The supply connections are common to the three amplifiers but the marking connections (corresponding to the CP output connections of FIG. 1) are individual to the amplifiers. In like manner amplifier modules could be assembled at the ends of the columns of modules to provide drive amplifier associated with the digit marking leads V, W, X, Y, Z as already mentioned in connection with FIG. 1.

Figure 3:
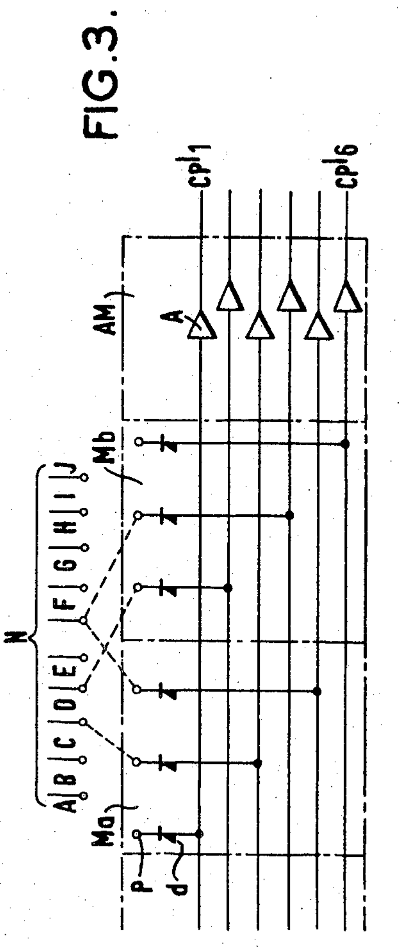
FIG. 3 illustrates a portion of a system wherein a pair of modules in accordance with FIG. 2 are arranged in side by side relationship.

A similar modular assembly can cater for digital identifications in one-out-of-ten code rather than two-out-of-five. The basis of this is illustrated in FIG. 3 for a single (decimal) digit N taken as typical. For this digit there are ten marking leads A–J of which one is uniquely marked to indicate the digit value. These can be constituted by the V–Z conductors of a pair of side-by-side diode modules of the form shown in FIG. 2, such pair of modules being represented by M*a*, M*b* in FIG. 3. Only a single strapping terminal such as P is now required for the digit N for each different identification to be translated (instead of a pair such as 1P1 as in FIG. 1). The pair of modules M*a* and M*b* can therefore together serve six code points CP'1–CP'6 through respective code-point amplifiers such as A provided in an amplifier module AM, or, possibly, in a pair of such amplifier modules containing three amplifiers each. It will be noted that the total number of code points served by a given number of diode module pairs is the same as before. The pair of modules M*a*, M*b* are in this instance required to provide six diodes between them: this may be done by providing three in each (as indicated in FIG. 3) or six in one and none in the other: the latter arrangement permits the use of the same diode cards as in FIG. 2. The two-out-of-five coding requires fewer drive amplifiers but twice as many diodes per code-point than does the one-out-of-ten coding. Choice of code actually to be used will depend on particular circumstances including the relative economics of the diode and amplifier requirements.

What I claim is:

1. A code point translator comprising:
   - a plurality of modularly dimensioned circuit element cells assembled next to one another in row and column formation forming a modular assembly, each modular cell having two end faces, the overall assembly having two faces forming by the totalities of the cell end faces at the two ends,
   - an assembly of diodes contained in each modular cell,
   - terminal connections extending from said diodes out through the modular cell end faces,
   - and multipling connections extending across the ends of the cells,
   - wherein at one assembly face the terminal connections project at positions clear of the multipling connections for selective strapping to selected ones of these multipling connections, and wherein the multipling connections at the other assembly face are respectively connected with the terminal connections extending from each cell which they cross.

2. A translator as claimed in claim 1 wherein each multipling connection is constituted by individual transverse conductors provided individually on the end faces of respective modular cells and connected end-to-end along a row or column of cells.

3. A translator as claimed in claim 1 wherein each cell comprises a hollow structure, a card or board contained in the structure and carrying the diodes, and respective rows of projecting terminal members provided at opposite edges of said card or board and protruding out through opposite end faces of its cell to constitute said terminal connections, and wherein the multipling connections across said one face of the modular assembly extend generally parallel to the rows of protruding terminal members, while the multipling connections across the other face extend orthogonally.

4. A translator as claimed in claim 3 comprising connection tags integral with and upstanding from the multipling connections, conductive straps connecting selected ones of the protruding terminal members with the upstanding tags of respective multipling connections, and wherein at the other end face the terminal members protrude alongside the tags for connection thereto.

5. A translator as claimed in claim 1 comprising in combination in said assembly amplifier modular cells each comprising a modular structure having at least one end face, an assembly of circuit elements contained within said structure and constituting a plurality of code point amplifiers, and terminal connections extending out through the cell end face, wherein the multipling connections extending across said one face of the assembly also extend across the amplifier modular cell end faces for connection to these last mentioned terminal connections.

References Cited

UNITED STATES PATENTS

| | | | |
|---|---|---|---|
| 2,749,484 | 6/1956 | Levitt | 317—101 |
| 2,872,664 | 2/1959 | Minot | 317—101 X |
| 2,936,407 | 5/1960 | Ewald | 317—101 X |
| 3,215,898 | 11/1965 | Perret et al. | 339—18 X |

ROBERT K. SCHAEFER, *Primary Examiner.*

D. SMITH, *Assistant Examiner.*